Aug. 28, 1962 W. W. KENNEDY 3,051,073
AIR DISTRIBUTION OUTLET
Filed May 15, 1961 3 Sheets-Sheet 1
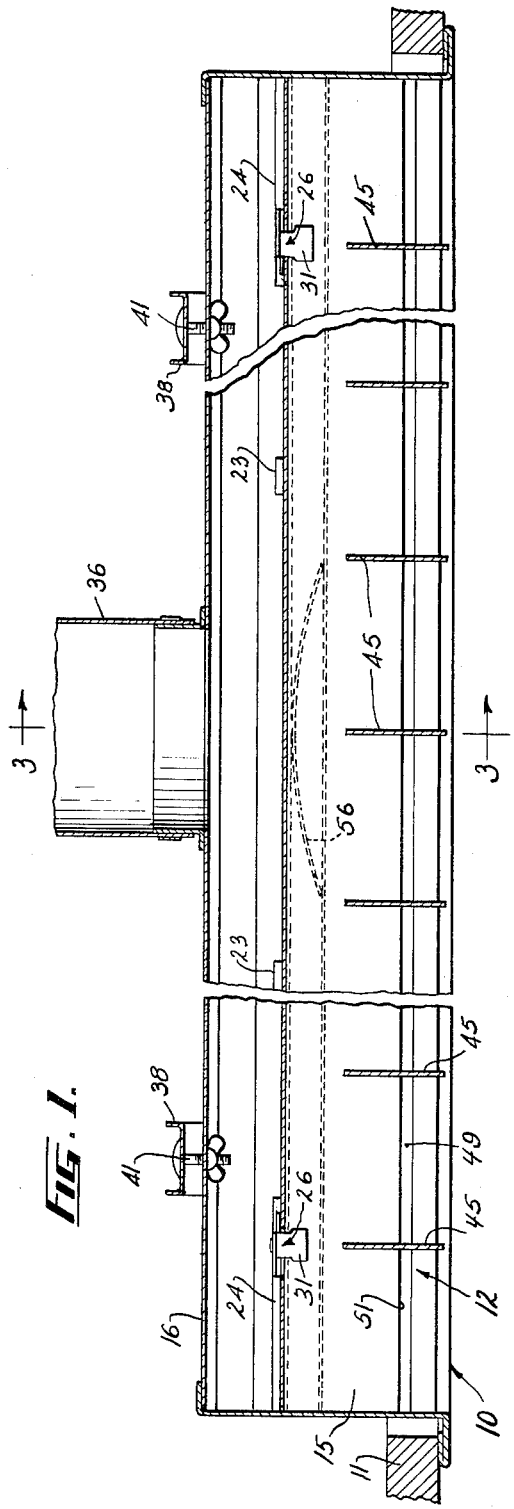
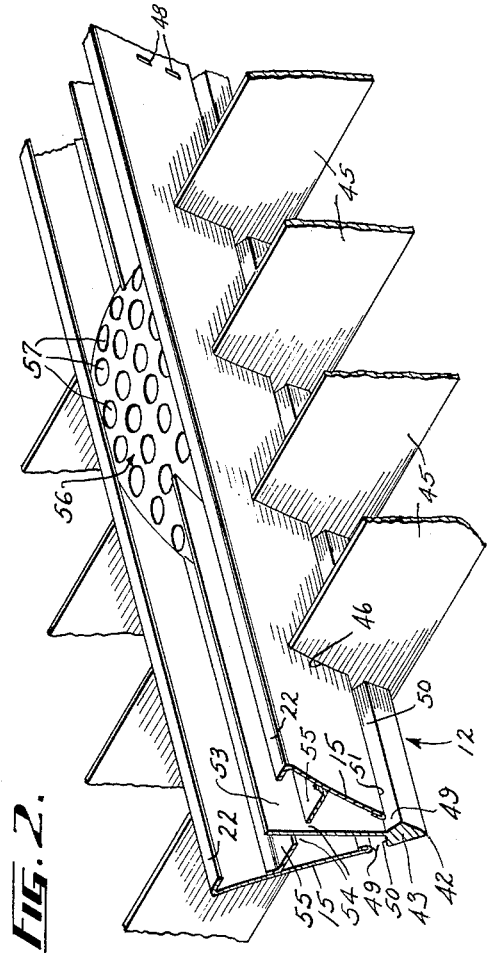
INVENTOR.
Walter W. Kennedy
BY
Wolfe, Hubbard, Voit & Osann
ATTORNEYS

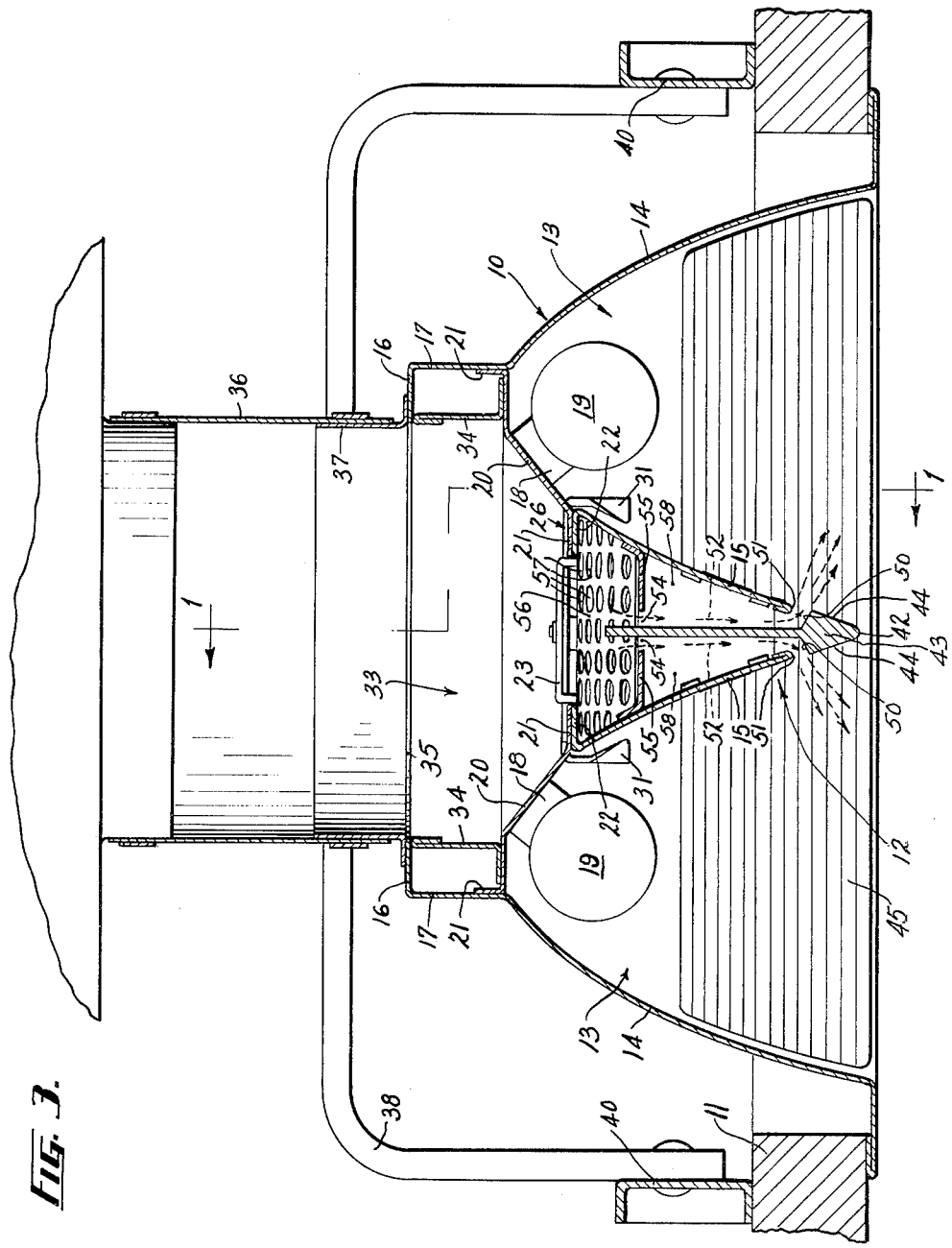

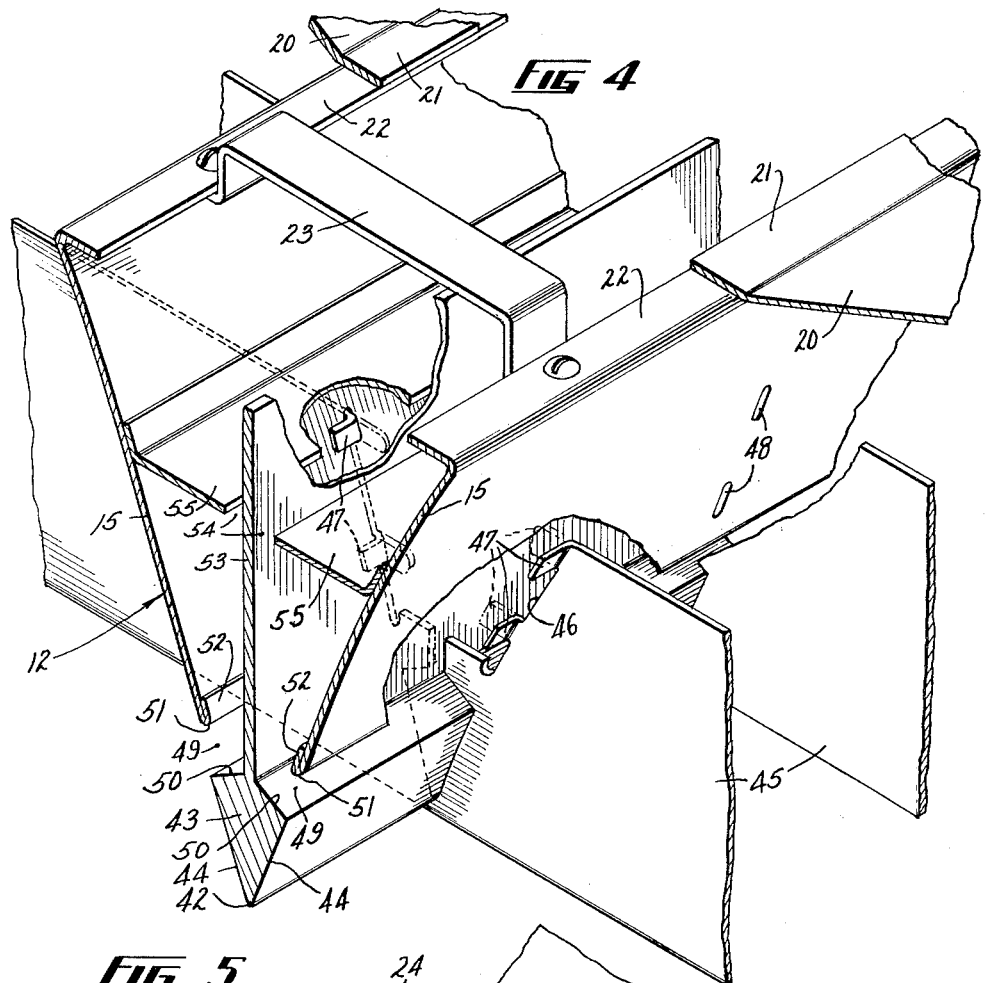
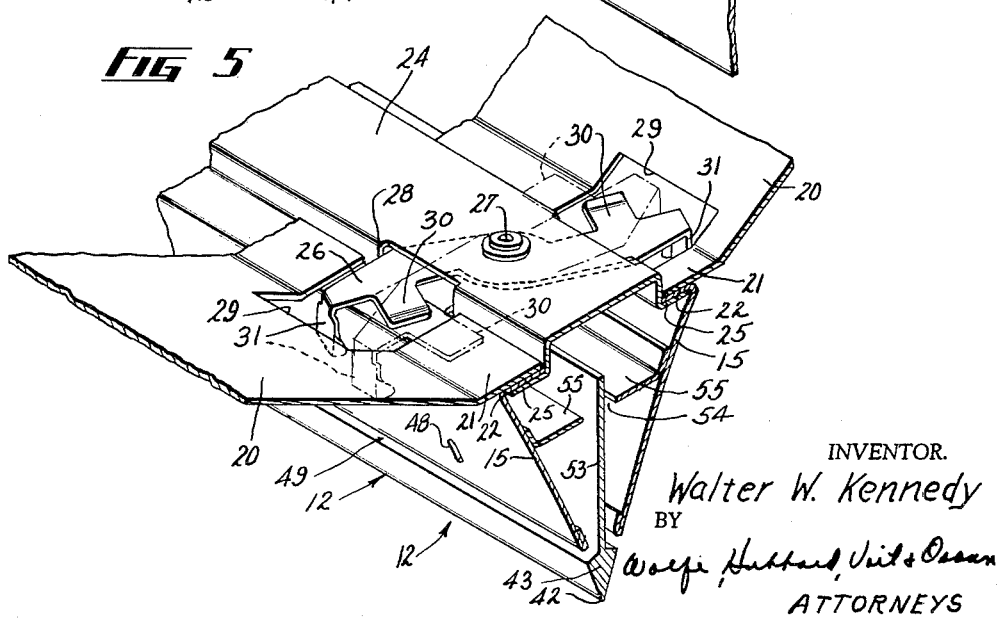

United States Patent Office 3,051,073
Patented Aug. 28, 1962

3,051,073
AIR DISTRIBUTION OUTLET
Walter W. Kennedy, Rockford, Ill., assignor to Barber-Colman Company, Rockford, Ill., a corporation of Illinois
Filed May 15, 1961, Ser. No. 109,963
4 Claims. (Cl. 98—40)

This invention relates to an air distribution outlet adapted to be combined with a double fluorescent lighting fixture and having walls which not only control the pattern of air discharge into a room but also form reflector surfaces for the light bulbs.

The primary object is to provide an air distribution outlet of the above character which does not detract from the operating efficiency of the light bulbs.

A more detailed object is to distribute air through a channel of V-shaped cross-section having side walls providing reflecting surfaces for the lamp bulbs and disposed outside of the effective reflecting area and adapted to deliver air into the room in the form of diverging streams.

The invention also resides in the novel and simple construction of the channel for producing the diverging air pattern.

Other objects and advantages of the invention will become apparent from the following detailed description taken in connection with the accompanying drawings, in which FIGURE 1 is a fragmentary vertical sectional view of a combined lighting fixture and air distributor embodying the novel features of the present invention, the section being taken along the line 1—1 of FIG. 3.

FIG. 2 is a fragmentary perspective view of one part of the air distributor.

FIG. 3 is a fragmentary section taken along the line 3—3 of FIG. 1.

FIG. 4 is a fragmentary perspective view of another part of the air distributor.

FIG. 5 is a similar perspective of the end portion of the air distributor.

On the drawing, the invention is shown for purposes of illustration incorporated in a combined lighting fixture and air distribution outlet comprising generally an elongated downwardly opening troffer 10 adapted to be set into a recess in the ceiling 11 of a room and coacting with an elongated air distributing device 12 to provide two parallel inverted troughs 13. The outer side walls 14 and the opposed side walls 15 of the distributing device are spaced apart laterally and shaped to provide concaved surfaces of generally parabolic cross-section for reflecting light rays downwardly from elongated fluorescent lamp bulbs 19 set above the edges of the troughs and substantially at the focal point of the respective parabolas.

The outer reflector walls 14 comprise laterally spaced flanges on a sheet metal stamping having a flat top wall 16, depending parallel side walls 17 merging with the upper edges of the curved walls 14. Brackets 18 supporting opposite ends of fluorescent bulbs 19 are secured to strips 20 of sheet metal having upstanding flanges 21 secured as by welding to the side walls 17 of the troffer stamping. The strips 20 which form the top walls of the reflector troughs 13, extend inwardly and horizontally from the side walls 17 and then are inclined downwardly to merge with the side walls 15 of the air distributor 12.

Beyond the junction of these walls, the strips 20 continue inwardly in a horizontal plane as indicated at 21 and overlie horizontal flanges 22 turned inwardly at the upper edges of the reflector walls 15. The flanges 21 are joined at spaced points along their length by straps 23 (FIG. 4) and at their ends by inverted channel shaped plates 24 disposed between the edges of the flanges 21. Outwardly projecting flanges 25 on the channel underlie and are welded to the flanges 22.

To fasten the air distributor 12 detachably in the troffer, locking levers 26 (FIG. 5) are fulcrumed on pins 27 supported by the channels 24 with opposite ends projecting outwardly through notches 28 in the sides of the channel and matching notches 29 in the flanges 21. In the position of the levers shown in FIG. 5, the locking levers are released and the air distributor disconnected from the channels so that it may be lowered and removed from the troffer. Lugs 30 bent up at their ends project from the sides of the levers 26 and lugs 31 are bent downwardly at the ends of the levers to provide handles which are accessible within the reflector troughs 13. When the levers are swung counter-clockwise to the position shown in phantom in FIG. 5, the lugs 30 move over the tops of the troffer flanges 21 and thus clamp the latter against the flanges 22 of the air distributor.

The inner edges of the flanges 21 define the top or inlet opening of the air distributor 12 which opening communicates with a plenum chamber 33 whose bottom is defined by the strips 20. Angle bars 34 define the sides of the chamber and join the strips 20 with the top wall 16. Through a hole 35 cut in the latter at the longitudinal center thereof, the chamber 33 communicates with a branch air supply duct 36 joined to the troffer by a telescoping collar 37 whose flanged end is welded to the top wall 16. The troffer is supported in the ceiling opening through inverted U-shaped brackets 38 secured at 40 to the ceiling structure. Intermediate their ends, the brackets are apertured to receive bolts 41 extending through the top wall 16 and suspending the troffer removably in the ceiling opening.

The curved side walls 15 of the reflector troughs 13 converge downwardly to an apex 42 which is spaced well below the effective reflecting areas of these walls. While the apex may be defined by merging of the side walls 15, it is formed in the present instance by a bar 43 of V-shaped cross-section having side surfaces 44 which constitute extensions of the surfaces of the walls 15. The bar 43 is slid endwise through cross-fins 45 which are notched at 46 as shown in FIGS. 2, 3 and 4 to correspond to the V-shaped section of the distributor 12 including the bar 43 which seats in the apex of the fin notches.

The fins 45 extend across the full width of the troffer 10 including the two troughs 13. They are disposed in vertical planes below the bulbs 19 and are notched as indicated at 46 to receive the V-shaped lower edge portion of the air distributor. Tabs 47 as shown in phantom in FIG. 4 are entered through slots 48 in the walls 15 and then bent laterally on the inner sides thereof to lock each fin rigidly to the distributor 12. The apex of the fin notches 46 corresponds to the cross-section of the bar 43 which seats in the notch so as to be supported from the walls 15 through the medium of the fins.

In accordance with the present invention, openings 49 of narrow width are formed in and extend along the full length of the distributor 12 near the apex 42 and means is provided within the distributor for producing two curtain-like streams 52 of air, indicated by the dotted arrows in FIG. 3, and deflecting the same outwardly in a well defined downwardly diverging pattern as illustrated by the full line arrows. For this purpose, the openings 49 take the form of narrow slots about ¼ of an inch wide defined by the top surfaces 50 of the V-shaped bar 43 and the opposing lower edges 51 of the walls 15, which edges are formed herein by bending the walls reversely and inwardly as indicated at 52.

Outward deflection of the air streams is caused by the surfaces 50 on the bar 43. These surfaces are sloped outwardly and downwardly to correspond to the angle of divergence desired in the air discharge pattern.

The air forced downwardly from the plenum chamber 33 is formed into the two separate streams 52 and directed against the deflecting surfaces 50 by a partition 53 bisecting the angle included between the side walls 15 and disposed within the distributor 12 between openings 54 which communicate with the plenum chamber 33. These openings are defined by opposite sides of the partition 53 and the opposed edges of horizontal plates 55 having flanges welded to the inner sides of the walls 15 intermediate the upper and lower edges of the latter. The upper part of the distributor thus becomes a part of the plenum chamber 33 in which a back pressure is built up by making the combined area of the openings 54 somewhat smaller than the cross-sectional area of the branch supply duct 36. In the present instance, the partition 53 is formed as an integral part of the bar 43, the two preferably being extruded from die casting metal.

Distribution of the air from the plenum chamber along the full lengths of the openings 54 is achieved by a suitable deflector 56 preferably disposed in the upper part of the distributor 12. Herein the deflector comprises an arcuate plate curving downwardly with its opposite ends resting on the partition plates 55. The deflector is perforated by holes 57 to insure the delivery of the proper volume of air to the areas of the openings 54 immediately below the plate. By locating the deflector below the inlet duct, some of the air delivered downwardly therefrom passes through the holes 57 while the remainder is diverted laterally in opposite directions and thus distributed along the full length of the openings 54.

It will be apparent that with the supply duct 36 sized as above described and the areas of the openings 54 correlated with the areas of the discharge slots 49, the plenum chamber will be maintained under pressure but there will be no pressure build-up in the chambers 58 within the air distributor 12. Thus, the air delivered downwardly through the openings 54 will be formed into the curtain-like streams which are confined against opposite side faces of the partition 53. These streams are thus directed against the surfaces 50 and thereby deflected outwardly and downwardly at angles corresponding to the inclination of these surfaces. The flow paths of the air thus discharged from the distributor are controlled and well defined so as to produce the desired diverging pattern of two curtain-like streams as shown by the arrows in FIG. 3.

I claim as my invention:

1. In an air distribution outlet, the combination of an elongated upwardly opening channel of V-shaped cross-section defined by imperforate sidewalls converging downwardly at substantially equal angles to an apex, air discharge openings comprising elongated slots in said walls extending along the channel and disposed adjacent to but spaced above said apex, a partition disposed within and extending throughout the length of said channel and bisecting the angle included between said walls, flanges on said walls projecting inwardly therefrom toward but short of said partition to define with the latter narrow air passages having a combined area less than that of said slots, means defining a plenum chamber enclosing the open base of said V-shaped channel, a supply duct for delivering air into said plenum chamber to maintain the chamber under pressure while causing curtains of air to be discharged through said passages and downwardly along opposite sides of said partition, and deflector surfaces within said channel extending upwardly and inwardly from the lower edges of said slots to said partition for impingement by said air curtains and deflection of the latter and outwardly through said slots at angles corresponding to the inclination of the deflector surfaces.

2. In an air distribution outlet, the combination of, an elongated upwardly opening horizontal channel of V-shaped cross-section defined by imperforate sidewalls converging downwardly at substantially equal angles to an apex, air discharge openings comprising elongated slots in said walls extending along the channel and disposed adjacent to but spaced above said apex, a partition disposed within and extending throughout the length of said channel and bisecting the angle included between said walls, means defining a plenum chamber enclosing the open base of said V-shaped channel, means within said channel cooperating with said partition to define narrow air passages for confining the downward flow of air through the channel in the form of thin curtains, the combined area of said passages being less than that of said slots, a supply duct for delivering air into said plenum chamber to maintain the chamber under pressure, and deflector surfaces within said channel and adjacent said apex extending upwardly and inwardly from the lower edges of said slots to said partition for impingement by said air curtains and deflection of the latter laterally and outwardly through said slots at angles corresponding to the inclination of the deflector surfaces.

3. In an air distribution outlet, the combination of, an elongated upwardly opening channel of V-shaped cross-section defined by imperforate sidewalls converging downwardly to an apex, air discharge openings comprising elongated slots in said walls extending along the channel substantially throughout the length thereof and disposed adjacent to but spaced above said apex, a partition disposed within and extending throughout the length of said channel between said walls, means defining a plenum chamber enclosing the open base of said V-shaped channel, means within said channel cooperating with said partition to define narrow air passages for confining the flow of air through the channel in the form of thin curtains disposed against opposite faces of the partition, the combined area of said passages being less than that of said slots, a supply duct for delivering air into said plenum chamber to maintain the chamber under presure, and deflector surfaces within said channel and adjacent said apex extending inwardly and away from said apex at the outer edges of said slots, said air curtains impinging against said deflector surfaces so as to be diverted laterally and outwardly through said slots at angles corresponding to the inclination of the deflector surfaces.

4. In an air distribution outlet, the combination of, an elongated upwardly opening channel of triangular V-shaped cross-section having one imperforate upright sidewall substantially normal to the base of the triangle and an opposite sidewall converging downward to the apex at the lower end of said first wall, an air discharge opening comprising a slot in said second wall adjacent to but spaced above said apex and extending longitudinally of said channel, means defining a plenum chamber enclosing the open base of said V-shaped channel, means within said channel cooperating with said first wall to define a narrow air passage for confining the downward flow of air through the channel in the form of a thin curtain, the area of said passage being less than that of said slot, a supply duct for delivering air into said plenum chamber to maintain the chamber under pressure, and a deflector surface within said channel and adjacent said apex extending upwardly and inwardly from the lower edge of said slot to said partition for impingement by said air curtain and deflection of the latter laterally and outwardly through said slot at an angle corresponding to the inclination of the deflector surface.

References Cited in the file of this patent
UNITED STATES PATENTS 2,985,090    Quin   ---------------- May 23, 1961
3,004,142    Archer   -------------- Oct. 10, 1961